(12) United States Patent
Mondal et al.

(10) Patent No.: US 11,643,607 B2
(45) Date of Patent: May 9, 2023

(54) PROCESS FOR PRODUCTION OF GRAPHITE COKE FROM AN ADMIXTURE OF COAL AND PETROLEUM BASED HYDROCARBONS

(71) Applicant: Indian Oil Corporation Limited, Mumbai (IN)

(72) Inventors: Prantik Mondal, Faridabad (IN); Ponoly Ramachandran Pradeep, Faridabad (IN); Terapalli Hari Venkata Devi Prasad, Faridabad (IN); Satyen Kumar Das, Faridabad (IN); Madhusudan Sau, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

(*) Notice: Subject to any disclaimer, the term of this patent is extended or adjusted under 35 U.S.C. 154(b) by 0 days.

(21) Appl. No.: 17/391,929

(22) Filed: Aug. 2, 2021

(65) Prior Publication Data
US 2022/0041935 A1 Feb. 10, 2022

(30) Foreign Application Priority Data
Aug. 5, 2020 (IN) .............................. 202021033561

(51) Int. Cl.
*C10G 55/04* (2006.01)
*C10B 55/00* (2006.01)
(Continued)

(52) U.S. Cl.
CPC .............. *C10G 55/04* (2013.01); *B01D 3/06* (2013.01); *B01D 3/143* (2013.01);
(Continued)

(58) Field of Classification Search
CPC ........ C10G 9/005; C10G 55/04; C10B 55/00; C10B 57/045
See application file for complete search history.

(56) References Cited

U.S. PATENT DOCUMENTS

| 3,617,515 A | 11/1971 | Bloomer |
| 4,814,063 A | 3/1989 | Murakami et al. |
(Continued)

FOREIGN PATENT DOCUMENTS

| CN | 104560104 | * 10/2013 | ............... C10G 9/00 |
| GB | 2013710 A | * 8/1979 | ............. C10B 55/00 |

OTHER PUBLICATIONS

English machine translation of CN 104560104 (Year: 2013).*

*Primary Examiner* — Renee Robinson
(74) *Attorney, Agent, or Firm* — Workman Nydegger (57) ABSTRACT

The present invention provides a process for production of graphite coke from an admixture of coal and petroleum-based hydrocarbons. This particularly describes a process wherein a mixture of coal tar pitch and hydrocarbon feedstock such as CLO is purified in a solvent treatment step and the purified mixed feedstock is subjected to thermal cracking to produce high quality graphite/needle coke. This process also provides a synergy in improved coke quality coke formation while using an admixture of coal tar pitch and CLO while subjected to common purification and coking steps.

12 Claims, 2 Drawing Sheets

(51) Int. Cl.
*C10B 57/04* (2006.01)
*B01D 3/06* (2006.01)
*B01D 3/14* (2006.01)
*B01D 11/04* (2006.01)
*C10G 9/00* (2006.01)
*C10G 53/04* (2006.01)

(52) U.S. Cl.
CPC .......... *B01D 11/0488* (2013.01); *C10B 55/00* (2013.01); *C10B 57/045* (2013.01); *C10G 9/005* (2013.01); *C10G 53/04* (2013.01)

(56) References Cited

U.S. PATENT DOCUMENTS

2019/0055481 A1* 2/2019 Pradeep .................. C10B 55/00
2019/0153323 A1* 5/2019 Koseoglu ............... C10G 69/06

* cited by examiner

PROCESS FOR PRODUCTION OF GRAPHITE COKE FROM AN ADMIXTURE OF COAL AND PETROLEUM BASED HYDROCARBONS

FIELD OF THE PRESENT INVENTION

The present invention relates to preparation of premium quality graphite or needle grade coke from a synergistic mixture of coal and petroleum-based hydrocarbon feedstocks. More particularly, present invention provides a process for production of graphite grade coke employing a solvent treatment step to purify a mixture of coal-based feedstock like coal tar pitch and hydrocarbon feedstock like clarified oil (CLO) to effect removal of quinoline insoluble materials from coal tar pitch as well as catalyst fines from CLO. Further, the present invention provides a system for production of graphite grade coke.

BACKGROUND OF THE PRESENT INVENTION

Graphite grade Coke, also known as Needle Coke is a premium grade high value petroleum coke which is characterized by high electrical conductivity and low coefficient of thermal expansion (CTE) and it is mostly used in the manufacturing of graphite electrodes for electric arc furnaces operating at temperature around 2800° C. in steel industry and also used for manufacturing of anodes for Electric Vehicle (EV) batteries. Primarily, it is a dense mass formed with a structure of carbon threads or needles oriented in a single direction. Graphite grade coke is available in calcined form which is produced in a coke calciner unit using green graphite coke produced in Delayed Coker unit.

U.S. Pat. No. 3,617,515 describes a process for producing graphitizable needle coke by Delayed Coking of a nonpetroleum fraction having a high content of condensed ring aromatic compounds and lower and upper cut points within the range from about 600° F. to about 1200° F. In a preferred embodiment, the US patent discloses that the fraction is separated from coal tar pitch having components boiling above 1000° F. and the fraction boiling above 1000° F. coked to form graphite grade coke. The prior art process described by U.S. Pat. No. 3,617,515 for production of needle coke can process only a narrow range of coal-based feedstock, which contains much of asphaltenes, quinoline insoluble substances and other impurities. These impurities, when present in the hydrocarbon matrix creates disturbance during forming of mesophase resulting in formation of low quality high CTE needle/graphite coke. These impurities also cause coke lay-down inside the furnace tubes affecting the heat transfer efficiency and pressure drop.

U.S. Pat. No. 4,814,063 describes a method of producing the needle coke for graphite electrodes, wherein the starting material derived from coal tar containing less than 0.1 weight percent of quinoline insoluble substances is subjected to hydrogenation in the presence of hydrogenation catalyst to give the hydrogenated oil which is further subjected to thermal cracking under the controlled condition to produce the coke. Production of needle coke by U.S. Pat. No. 4,814,063 requires use of costly hydrogenation process for removal of impurities from the coal tar-based feedstock. Also, there is a high probability of reduction in aromatic content and reactivity of the hydrocarbon feedstock due to hydrogenation process which can impact the coke quality adversely.

Reducing availability of low sulfur residue oil feedstocks due to their increasing demand for low sulfur Bunker Fuel Oil (FO) production leaves the refiners with lesser options for production of graphite or needle grade coke. Increasing adoption of electric arc furnace technology for steel production across the world has increased the demand for graphite or needle grade coke. In addition, with increasing adoption of coal pyrolysis units and coke oven batteries worldwide, there is increasing availability of coal-based hydrocarbon feedstock for production of graphite coke. Consequently, development of cost effective and simple process of production graphite or needle grade coke is necessitated to meet the increasing demand of needle grade coke.

OBJECTIVES OF THE PRESENT INVENTION

It is a primary objective of the present invention is to provide a process for production of graphite or needle grade coke for manufacturing of graphite electrode which is used in electric arc furnace during steel making.

It is the further objective of the present invention to prepare graphite coke by selective separation of quinoline insoluble (QI) substances and solid catalyst fines together followed by thermal cracking of the purified hydrocarbon feedstock material.

It is yet another objective of the present invention to increase the rate of impurity precipitation from coal tar pitch by using a mixed feedstock comprising coal tar pitch and clarified oil (CLO) to the solvent treatment section.

Further the object of this invention is to provide a process that involves the solvent assisted precipitation technique followed by thermal cracking for preparation of graphite coke.

SUMMARY OF THE PRESENT INVENTION

The present invention provides a process for production of graphite grade coke using a synergistic admixture of coal and petroleum-based feedstocks containing impurities like catalyst fines and quinoline insoluble (QI) substances. In particular, the present invention provides a solvent treatment step to purify the mixture of coal-based feedstock like coal tar pitch and hydrocarbon feedstock like clarified oil (CLO) to effect removal of QI material from coal tar pitch as well as catalyst fines from CLO.

The present invention provides a process for production of graphite grade coke comprising:
  (a) mixing coal tar pitch and CLO streams to obtain a mixed feedstock and routing the mixed feedstock to a solvent treatment vessel where it mixes with a solvent, wherein the coal tar pitch and the CLO are blended in a weight ratio ranging from 90:10 to 40:60;
  (b) separating the mixed feedstock into a heavy residual fraction containing impurities and a first purified mixed feedstock without impurities, and removing the heavy residual fraction as pitch from bottom of the solvent treatment vessel, wherein the impurities are quinoline insoluble substances along with solid catalyst fines;
  (c) passing the heavy residual fraction (pitch) to a first heater to obtain a heated pitch and flashing the heated pitch into a first solvent recovery column;
  (d) withdrawing a heavy pitch stream from bottom of the first solvent recovery column and routing overhead of the first solvent recovery column containing recovered solvent stream back to the solvent treatment vessel;
  (e) routing the first purified mixed feedstock from the solvent treatment vessel to a second heater to obtain a heated first purified mixed feedstock and flashing the heated first purified mixed feedstock into a second solvent recovery column;

(f) routing overhead from the second solvent recovery column containing recovered solvent stream back to the solvent treatment vessel and routing bottom from the second solvent recovery column to a bottom section of a fractionator column, wherein the bottom from the second solvent recovery column contains a second purified mixed feedstock without solvent;

(g) mixing the second purified mixed feedstock obtained in step (f) with an internal recycle stream in the bottom section of the fractionator column to obtain a secondary feedstock and drawing out the secondary feedstock from bottom of the fractionator column, wherein the internal recycle stream is obtained after separation of gaseous products and liquid products from lighter hydrocarbon products that are routed to the fractionator column from a coke drum;

(h) heating the secondary feedstock in a coker heater to a thermal cracking temperature to obtain a hot secondary feedstock;

(i) routing the hot secondary feedstock to a coke drum for cracking the feedstock to lighter hydrocarbon products and a graphite grade coke; wherein the graphite grade coke is a graphitizable needle coke and is deposited in the coke drum;

(j) routing the lighter hydrocarbon products from the coke drum to the fractionator column for separation into gaseous products and liquid products;

(k) routing overhead vapour from the fractionator column comprising the gaseous products to a gas concentration section and withdrawing the liquid products from the fractionator column.

Further, the present invention provides a system for production of graphite grade coke comprising:

(a) a solvent treatment vessel (3) for receiving a mixed feedstock (1,2) and a solvent (4), and for separating the mixed feedstock into a heavy residual fraction containing impurities and a first purified mixed feedstock without impurities, wherein the impurities are quinoline insoluble substances along with solid catalyst fines;

(b) a first heater (6) for receiving the heavy residual fractions as pitch (5) from bottom of the solvent treatment vessel (3);

(c) a first solvent recovery column (7) for receiving a heated pitch from the first heater (6) to obtain a recovered solvent stream (9) and a heavy pitch stream (8);

(d) a second heater (11) for receiving the first purified mixed feedstock (10) from the solvent treatment vessel (3);

(e) a second solvent recovery column (12) for receiving a heated first purified mixed feedstock from the second heater (11) to obtain a recovered solvent stream (13) and a second purified mixed feedstock without solvent (14);

(f) a fractionator column (15) for receiving the second purified mixed feedstock without solvent (14) and mixing with an internal recycle stream to obtain a secondary feedstock (16), wherein the fractionator column further receives lighter hydrocarbon products (22) from the coke drum to obtain gaseous products (23) and liquid products (24,25, 26), wherein the liquid products are kerosene, LCGO, and HCGO;

(g) a coker heater (17) for heating the secondary feedstock (16) from bottom of the fractionator column (15) at a thermal cracking temperature to obtain a hot secondary feedstock (19);

(h) coke drums (20, 21) for receiving the hot secondary feedstock (19) for cracking the feedstock to lighter hydrocarbon products (22) and a graphite grade coke, wherein the graphite grade coke is a graphitizable needle coke and is deposited in the coke drum.

BRIEF DESCRIPTION OF THE DRAWINGS OF THE PRESENT INVENTION

DESCRIPTION OF THE PRESENT INVENTION

For the purpose of promoting an understanding of the principles of the present disclosure, reference will now be made to the specific embodiments of the present invention further illustrated in specific language to describe the same. The foregoing general description and the following detailed description are explanatory of the present disclosure and are not intended to be restrictive thereof. It will nevertheless be understood that no limitation of the scope of the present disclosure is thereby intended, such alterations and further modifications in the illustrated composition, and such further applications of the principles of the present disclosure as illustrated herein being contemplated as would normally occur to one skilled in the art to which the present disclosure relates. Unless otherwise defined, all technical and scientific terms used herein have the same meaning as commonly understood by one ordinarily skilled in the art to which this present disclosure belongs. The methods, products and examples provided herein are illustrative only and not intended to be limiting.

The present invention provides a process for production of graphite grade coke using a synergistic admixture of coal and petroleum-based feedstocks containing impurities like catalyst fines and quinoline insoluble (QI) substances. In particular, the present invention employs a solvent treatment step to purify the mixture of coal-based feedstock like coal tar pitch and hydrocarbon feedstock like clarified oil (CLO) to effect removal of QI material from coal tar pitch as well as catalyst fines from CLO. The solvent treatment section comprises of solvent extractor vessel for removal of impurities and solvent recovery section. The purified feedstock is then routed to thermal cracking section comprising fractionator column, furnace and coke drums. The purified mixed feedstock is routed to the bottom section of the fractionator column, where it will mix with the internal recycle stream and thereafter is withdrawn from the column bottom as the secondary feedstock. This secondary feedstock is heated in the furnace to desired temperature and is routed to the Coke Drums for effecting thermal cracking and graphite/needle coke formation. The lighter hydrocarbon vapor products generated in the Coke Drum are routed to the fractionator column and the solid graphitic/needle coke deposited in the Coke drums are removed in the Drum maintenance cycle by high pressure water jets.

Figure 1:
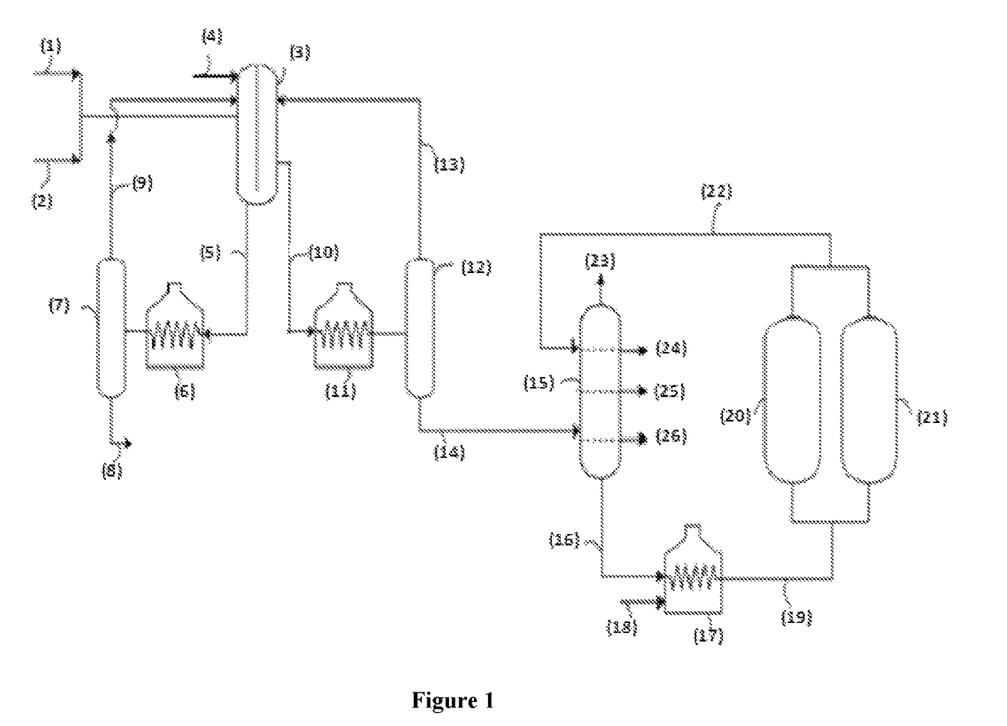
FIG. 1 illustrates schematic diagram of process of the present invention.

The present invention provides a process for production of graphite grade coke (FIG. 1) comprising:

(a) mixing coal tar pitch and CLO streams to obtain a mixed feedstock and routing the mixed feedstock to a solvent treatment vessel where it mixes with a solvent, wherein the coal tar pitch and the CLO are blended in a weight ratio ranging from 90:10 to 40:60;

(b) separating the mixed feedstock into a heavy residual fraction containing impurities and a first purified mixed feedstock without impurities, and removing the heavy residual fraction as pitch from bottom of the solvent treatment vessel, wherein the impurities are quinoline insoluble substances along with solid catalyst fines;

(c) passing the heavy residual fraction (pitch) to a first heater to obtain a heated pitch and flashing the heated pitch into a first solvent recovery column;

(d) withdrawing a heavy pitch stream from bottom of the first solvent recovery column and routing overhead of the first solvent recovery column containing recovered solvent stream back to the solvent treatment vessel;

(e) routing the first purified mixed feedstock from the solvent treatment vessel to a second heater to obtain a heated first purified mixed feedstock and flashing the heated first purified mixed feedstock into a second solvent recovery column;

(f) routing overhead from the second solvent recovery column containing recovered solvent stream back to the solvent treatment vessel and routing bottom from the second solvent recovery column to a bottom section of a fractionator column, wherein the bottom from the second solvent recovery column contains a second purified mixed feedstock without solvent;

(g) mixing the second purified mixed feedstock obtained in step (f) with an internal recycle stream in the bottom section of the fractionator column to obtain a secondary feedstock and drawing out the secondary feed stock from bottom of the fractionator column, wherein the internal recycle stream is obtained after separation of gaseous products and liquid products from lighter hydrocarbon products that are routed to the fractionator column from a coke drum;

(h) heating the secondary feed stock in a coker heater to a thermal cracking temperature to obtain a hot secondary feedstock;

(i) routing the hot secondary feedstock to a coke drum for cracking the feedstock to lighter hydrocarbon products and a graphite grade coke; wherein the graphite grade coke is a graphitizable needle coke and is deposited in the coke drum;

(j) routing the lighter hydrocarbon products from the coke drum to the fractionator column for separation into gaseous products and liquid products;

(k) routing overhead vapour from the fractionator column comprising the gaseous products to a gas concentration section and withdrawing the liquid products from the fractionator column.

In an embodiment, the present invention provides that the coal tar pitch and the CLO stream are mixed in a mixing tank to obtain the mixed feedstock.

In another embodiment, optionally a hydrotreated VGO (vacuum gas oil) is also mixed with the coal tar pitch and the CLO stream in a mixing tank to obtain the mixed feedstock, wherein addition of the hydrotreated VGO is in the range of 5 to 30 wt %.

In another embodiment, the present invention provides that a solvent stream from a solvent tank is introduced into the mixing tank for solvent treatment of the mixed feed.

In another embodiment, the present invention provides that the mixed feedstock containing the solvent is routed from the mixing tank to a separator vessel for separating the mixed feedstock into a heavy residual fraction containing impurities and a first purified mixed feedstock without impurities, and removing the heavy residual fraction as pitch from bottom of the separator vessel and the first purified mixed feedstock from top side of the separator vessel, wherein the impurities are quinoline insoluble substances along with solid catalyst fines.

In another embodiment, the present invention provides that the recovered solvent streams from the first solvent recovery column and the second recovery column are routed to the solvent tank for solvent recovery.

In another embodiment, the present invention provides that the solvent for treatment of the mixed feedstock in the solvent treatment vessel is selected from a polar extraction solvent, an aliphatic solvent, an aromatic solvent, or a combination thereof;

wherein the polar extraction solvent is n-methyl-2-pyrrolidone (NMP);

wherein the aliphatic solvent is selected from cyclohexane, kerosene, diesel oil, and n-heptane;

wherein the aromatic solvent is selected from toluene, wash oil (obtained by distilling coal tar with boiling range of 100° C.-270° C.), anthracene oil, naphthalene oil, and benzene.

In another embodiment, the present invention provides that the solvent in the solvent treatment vessel is mixed with a mixed feedstock (comprising of coal tar pitch and CLO) in a ratio of solvent and mixed feedstock ranging from 2:1 to 50:1, and the solvent treatment vessel is operated at a temperature ranging from 55 to 300° C. and a pressure ranging from 1 to 60 $Kg/cm^2$ (g).

In another embodiment, the present invention provides that the fractionator column is operated at a temperature ranging from 250° C. to 390° C.

In another embodiment, the present invention provides that the thermal cracking temperature in the coker heater in step (h) ranges from 480° C. to 530° C.

In another embodiment, the present invention provides that in the process step (h), steam is introduced to the coker heater to prevent coking in heater tubes and create additional turbulent flow.

In another embodiment, the present invention provides that the coke drum is operated at a temperature ranging from 475° C. to 520° C. and a top pressure is maintained between 1 to 6.5 $Kg/cm^2$ (g); wherein a feeding cycle time in the coke drum ranges from 16 hours to 48 hours.

Figure 2:
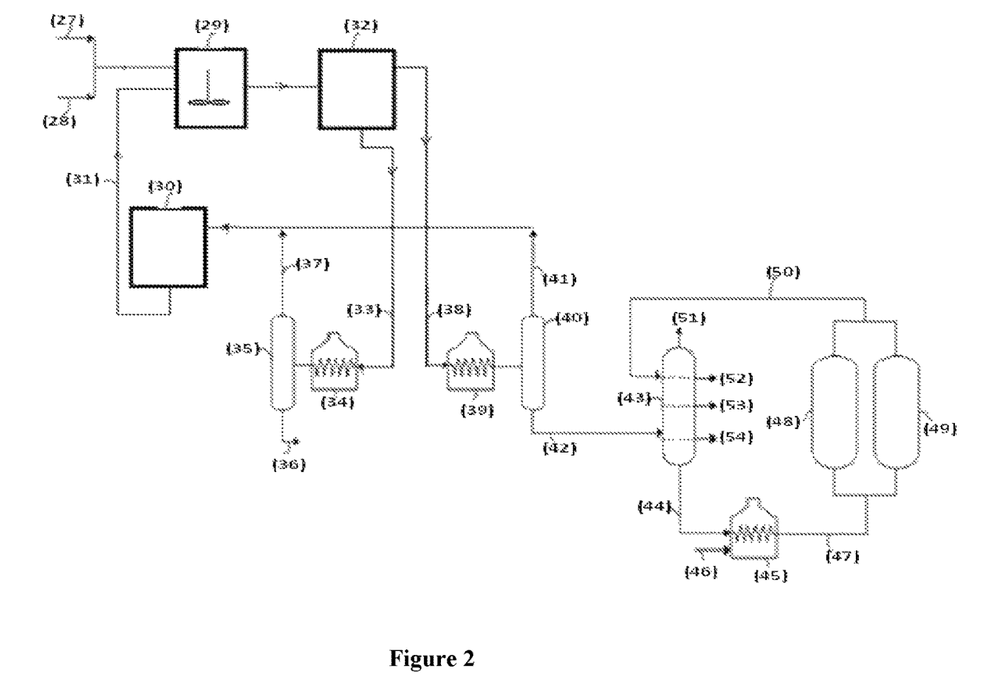
FIG. 2 illustrates schematic diagram of an embodiment of the present invention.

In a preferred embodiment, the present invention provides a process for production of graphite grade coke (FIG. 2) comprising:

(a) mixing coal tar pitch and CLO streams in a mixing tank to obtain a mixed feedstock, wherein the coal tar pitch and the CLO are blended in a weight ratio ranging from 90:10 to 40:60;

(b) routing a solvent stream from a solvent tank to the mixing tank for solvent treatment of the mixed feedstock;

(c) routing outlet from the mixing tank to a separator vessel for separating the mixed feedstock into a heavy residual fraction containing impurities and a first purified mixed feedstock without impurities, and removing the heavy residual fraction as pitch from bottom of the separator vessel, wherein the impurities are quinoline insoluble substances along with solid catalyst fines;

(d) passing the pitch to a first heater to obtain a heated pitch and flashing the heated pitch into a first solvent recovery column;

(e) withdrawing a heavy pitch stream from bottom of the first solvent recovery column and routing overhead of the first solvent recovery column containing recovered solvent stream back to the solvent tank;

(f) routing the first purified mixed feedstock from top side of the separator vessel to a second heater to obtain a heated first purified mixed feedstock and flashing the heated first purified mixed feedstock into a second solvent recovery column;

(g) routing overhead from the second solvent recovery column containing recovered solvent stream back to the solvent tank and routing bottom from the second solvent recovery column to a bottom section of a fractionator column, wherein the bottom from the second solvent recovery column contains a second purified mixed feedstock without solvent;

(h) mixing the second purified mixed feedstock obtained in step (f) with an internal recycle stream in the bottom section of the fractionator column to obtain a secondary feedstock and drawing out the secondary feed stock from bottom of the fractionator column, wherein the internal recycle stream is obtained after separation of gaseous products and liquid products from lighter hydrocarbon products that are routed to the fractionator column from a coke drum;

(i) heating the secondary feed stock in a coker heater to a thermal cracking temperature to obtain a hot secondary feedstock;

(j) routing the hot secondary feedstock to a coke drum for cracking the feedstock to lighter hydrocarbon products and a graphite grade coke; wherein the graphite grade coke is graphitizable needle coke and is deposited in the coke drum;

(k) routing the lighter hydrocarbon products from the coke drum to the fractionator column for separation into gaseous products and liquid products; and (l) routing overhead vapour from the fractionator column comprising the gaseous products to a gas concentration section and withdrawing the liquid products from the fractionator column.

Further, the present invention provides a system for production of graphite grade coke comprising: (a) a solvent treatment vessel (3) for receiving a mixed feedstock (1,2) and a solvent (4), and for separating the mixed feedstock into a heavy residual fraction containing impurities and a first purified mixed feedstock without impurities, wherein the impurities are quinoline insoluble substances along with solid catalyst fines;

(b) a first heater (6) for receiving the heavy residual fractions as pitch (5) from bottom of the solvent treatment vessel (3);

(c) a first solvent recovery column (7) for receiving a heated pitch from the first heater (6) to obtain a recovered solvent stream (9) and a heavy pitch stream (8);

(d) a second heater (11) for receiving the first purified mixed feedstock (10) from the solvent treatment vessel (3);

(e) a second solvent recovery column (12) for receiving a heated first purified mixed feedstock from the second heater (11) to obtain a recovered solvent stream (13) and a second purified mixed feedstock without solvent (14);

(f) a fractionator column (15) for receiving the second purified mixed feedstock without solvent (14) and mixing with an internal recycle stream to obtain a secondary feedstock (16), wherein the fractionator column further receives lighter hydrocarbon products (22) from the coke drum to obtain gaseous products (23) and liquid products (24,25, 26), wherein the liquid products are kerosene, light coker gas oil (LCGO), and heavy coker gas oil (HCGO);

(g) a coker heater (17) for heating the secondary feedstock (16) from the bottom of the fractionator column (15) at a thermal cracking temperature to obtain a hot secondary feedstock (19);

(h) coke drums (20, 21) for receiving the hot secondary feedstock (19) for cracking the feedstock to lighter hydrocarbon products (22) and a graphite grade coke, wherein the graphite grade coke is a graphitizable needle coke and is deposited in the coke drum.

In an embodiment, the present invention provides that the system comprises a mixing tank (29) for mixing the coal tar pitch and the CLO stream to obtain a mixed feedstock.

In an embodiment, the present invention provides that the system comprises a solvent tank (30) for receiving the recovered solvent streams from the first solvent recovery column and the second recovery column.

The present invention has following advantages over the prior arts:

1. enables the refiner to produce high quality graphite or needle grade coke using a blending of coal based and petroleum-based feedstocks followed by thermal cracking;
2. graphite coke is produced by using a feed blend sourced from coal based and petroleum-based hydrocarbons;
3. both the impurities, i.e. QI from coal tar pitch as well as catalyst fines from CLO are removed together in a common solvent treatment section;
4. solid catalyst fines which are present in the CLO stream increases the solvent separation of the quinoline insoluble materials from the coal-based hydrocarbon by providing active sites for aggregate formation;
5. effective removal of QI and asphaltenes from the total feedstock mixture comprising CLO and coal tar pitch; and
6. the mixture of purified coal tar pitch and CLO after solvent treatment produces higher quality graphite/needle coke in the thermal cracking section, than that would have been produced if said feedstock components were subjected to thermal cracking reactions separately.

Feedstock:

Coal tar pitch and clarified oil (CLO) is used in the process for preparation of high-quality needle coke. Coal tar pitch is having the CCR in the range of 5 to 45 wt % and CLO having a CCR in the range of 1 to 20 wt % respectively. Quinoline Insoluble (QI) content of the coal tar pitch used in the present invention is in the range of 0.5 to 15 wt %. The BS&W content of CLO used in the present invention is in the range of 0.1 to 2 vol %.

Solvent:

The solvent used in the present invention is selected from a polar extraction solvent, an aliphatic solvent, and an aromatic solvent with carbon numbers ranging from 3 to 15. A combination of a polar extraction solvent, an aliphatic and an aromatic solvent can be used as a mixed solvent in the presently disclosed process. Polar extraction solvent such as n-methyl-2-pyrrolidone (NMP), aromatic solvents such as anthracene oil, naphthalene oil, benzene, toluene, wash oil (obtained by distilling coal tar with boiling range of 100° C.-270° C.), and aliphatic solvents such as cyclohexane, kerosene, n-heptane, diesel oil etc. are used as a mixed solvent in the disclosed process.

Process Conditions:

Solvent to mixed feedstock ratio in the solvent treatment section is kept in the range of 2:1 to 50:1. Operating temperature of the solvent treatment section can vary from 55 to 300° C. and the pressure can vary from 1 to 60 Kg/cm$^2$ (g). The fractionator column of the thermal cracking section is operated at a bottom of temperature between 250° C. to 390° C. The furnace in the thermal cracking section is operated at an outlet temperature of coil in between 480° C. to 530° C. preferably 490° C. to 510° C. Coke Drum is operated at an operating temperature in the range of 475° C. to 520° C. preferably 480° C. to 500° C. and Coke Drum top pressure is maintained from 1 to 6.5 Kg/cm$^2$ (g) preferably 2.5 to 5.5 Kg/cm$^2$ (g). The feeding cycle time of the coke drums in thermal cracking section can vary from 16 hrs. to 48 hrs.

Process Description:

The process of the present invention is exemplified by, but not limited to the following figure.

A schematic process flow diagram of the invented process is provided as FIG. 1. Coal tar pitch (1) and CLO (2) streams are mixed together to form a mixed feedstock and is introduced to a solvent treatment vessel (3) where it mixes with the solvent (4). Heavy residual fractions of feed streams containing QI and solid catalyst fines get separated out and drawn from the bottom of the solvent treatment vessel as pitch (5). The pitch is passed through heater (6) and then flashed in the solvent recovery column (7) for solvent recovery. A heavy pitch stream (8) is withdrawn from the bottom of the unit which contains residual fractions of QI and catalyst fines along with heavy refractory hydrocarbon molecules. The purified mixed feedstock (10) containing solvent is withdrawn from the solvent treatment vessel is routed to a heater (11) and is then flashed in the solvent recovery column (12). The recovered solvent streams (9, 13) are sent back to the solvent treatment section. The purified mixed feedstock after removal of solvent (14) is withdrawn from the bottom of the solvent recovery column and is routed to the fractionator column (15) where it mixes with the internal recycle stream and is drawn out from the bottom as the secondary feedstock. Secondary feedstock (16) which is withdrawn from the bottom of the fractionator is routed to a furnace (17) for heating to the desired thermal cracking temperature. In addition, steam or boiler feed water stream (18) is introduced to coker heater to prevent coking in heater tubes and create additional turbulent flow. Hot feedstock (19) existing the heater is sent to one of the coke drums (20, 21) in the feeding step of the coking cycle, where heavy oil is cracked and is converted to graphitizable needle coke and lighter hydrocarbon components like fuel gas, LPG, naphtha, gas-oils etc. Product vapors (22) of the existing coke drum are sent to fractionator (15) for further separation. Overhead vapor of the fractionator comprised gaseous products (23) are routed to a gas concentration section for further recovery. Liquid products such as kero (24), LCGO (25), HCGO (26) are also withdrawn from the column as per desired cut ranges. Needle coke which is deposited in the coke drums is removed in the maintenance cycle by using high pressure water jets.

A schematic process flow diagram of the embodiment of invented process is provided as FIG. 2. Coal tar pitch (27) and CLO (28) streams are mixed together to form a mixed feedstock and is introduced to a mixing tank (29). A solvent stream (31) from solvent tank (30) is also introduced to the mixing tank for solvent treatment of the mixed feedstock. Feedstock from mixing tank is then routed to separator vessel (32) where heavy residual fractions of feed-streams containing QI and solid catalyst fines get separated out and drawn from the bottom of the vessel as pitch (33). The pitch is passed through heater (34) and then flashed in the solvent recovery column (35) for solvent recovery. A heavy pitch stream (36) is withdrawn from the bottom of the solvent recovery column (35) which contains residual fractions of QI and catalyst fines along with heavy refractory hydrocarbon molecules. The purified mixed feedstock (38) containing solvent is withdrawn from the top side of separator vessel is routed to a heater (39) and is then flashed in the solvent recovery column (40). The recovered solvent streams (37, 41) are sent back to the solvent tank (30). The purified mixed feedstock after removal of solvent (42) is withdrawn from the bottom of the solvent recovery column and is routed to the fractionator column (43) where it mixes with the internal recycle stream and is drawn out from the bottom as the secondary feedstock. Secondary feedstock (44) which is withdrawn from the bottom of the fractionator is routed to a furnace also termed as heater (45) for heating to the desired thermal cracking temperature. In addition, steam or boiler feed water stream (46) is introduced to Coker heater to prevent coking in heater tubes and create additional turbulent flow. Hot feedstock (47) existing the heater is sent to one of the coke drums (48,49) in the feeding step of the coking cycle, where heavy oil is cracked and is converted to graphitizable needle coke and lighter hydrocarbon components like fuel gas, LPG, naphtha, gas-oils etc. Product vapors (50) of the existing coke drum are sent to fractionator (43) for further separation. Overhead vapor of the fractionator comprised gaseous products (51) are routed to a gas concentration section for further recovery. Liquid products such as Kero (52), LCGO (53), HCGO (54) are also withdrawn from the column as per desired cut ranges. Needle coke which is deposited in the coke drums is removed in the maintenance cycle by using high pressure water jets.

The present invention provides the following illustrative non-limiting examples to better describe the workability of the present invention.

EXAMPLES

The process of present invention has been illustrated by following non-limiting examples.

Example-1

Coal tar pitch sample with properties as provided in Table-1 was taken and blended with CLO with properties as provided in Table-2 at a wt/wt ratio of 50/50.

TABLE 1

Properties of coal tar pitch (unpurified)

| Properties | Value |
|---|---|
| Density, g/cc | 1.21 |
| CCR, wt% | 30.3 |
| Sulfur, wt% | 0.57 |
| Nitrogen, wt% | 1.4 |
| Quinoline Insoluble (QI), wt% | 4 |

TABLE 2

Properties of CLO

| Properties | Value |
|---|---|
| Density, g/cc | 1.1 |
| CCR, wt% | 6.1 |
| Sulfur, wt% | 0.32 |
| Nitrogen, wt% | 0.08 |
| BS&W, wt% | 0.5 |

Said mixed feedstock was subjected to solvent treatment in a solvent treatment section at operating conditions as provided in Table-3.

TABLE 3

Operating conditions of solvent treatment section

| Operating parameter | Value |
|---|---|
| Solvent/Mixed feedstock ratio | 2.5 |
| Solvent used | n-heptane |
| Stirring time, minutes | 30 |
| Temperature, °C. | 75 |

The top portion of the hydrocarbon-solvent mixture after solvent treatment was separated and the solvent was evaporated by heating at 120° C. for 3 hrs. The purified mixed feedstock after solvent recovery was analyzed for key properties and the results are provided in Table-4.

TABLE 4

Properties of purified mixed feedstock

| Property | Value |
|---|---|
| QI, wt% | 0.3 |
| BS&W | Nil |

The purified mixed feedstock was subjected to thermal cracking reaction in a batch Micro-Coker experimental set up. As a comparative case, the Coal tar pitch sample without solvent treatment was also subjected to thermal cracking in a batch Micro-Coker experimental set up. The operating conditions and yields of the Micro-Coker experiment are provided in Table-5 and Table-6 respectively.

TABLE 5

Micro-Coker reactor experimental conditions

| Operating parameter | Value |
|---|---|
| Feed loaded, gm | 100 |
| Temperature,° C. | 486 |
| Pressure, kg/cm² (g) | 3 |
| Holding time, hrs | 4 |

TABLE 6

Coke yield of Micro-Coker reactor experimentation

| Feed | Coke yield, wt % | Coke sample ref No. |
|---|---|---|
| Coal tar pitch sample without solvent treatment and blending of CLO | 46.6 | A |
| Invented process | 40.2 | B |

From Table-6, it is seen that yield of the coke yield for coal tar sample without solvent treatment and blending with CLO is 46.6 wt % whereas yield of the coke for the invented process is 40.2 wt %. These coke samples were thereafter subjected to calcination in a lab calciner unit at 1300° C. and the calcined coke samples was analyzed in XRD analyzer. The XRD analysis shows 76% Crystallinity for calcined Coke-A without solvent treatment and 84% Crystallinity for calcined Coke-B of the invented process.

Example-2

Experiments in 1 bbl/day capacity Delayed Coker pilot plant unit were carried out of which the feedstock, operating conditions and obtained coke quality are given in Table-7.

TABLE 7

Pilot plant experimental conditions & coke quality

| Operating parameter | Run-I | Run-II | Run-III | Run-IV |
|---|---|---|---|---|
| Feedstock | Coal tar pitch (unpurified of Table-1) | Coal tar pitch (coal tar pitch of Table-1 purified in solvent treatment w/o mixing CLO) | CLO (of Table-2) | Purified mix feedstock of Coal tar pitch & CLO (1:1) of Table-4 |
| Temperature, °C. | 486 | 486 | 486 | 486 |
| Pressure, kg/cm² (g) | 3 | 3 | 3 | 3 |
| Cycle time, hrs | 12 | 12 | 12 | 12 |
| CTE of graphite artifact, ×10$^{-6}$/° C. | 2.92 | 1.62 | 1.26 | 1.33 |

Coke samples from all above runs were subjected to calcination and graphite artifacts in the shape of rods were prepared. Baked coke rod was used in Dilatometer for measurement of Coefficient of thermal expansion. It is seen that Coefficient of thermal expansion (CTE) value upon blending of purified coal tar pitch and CLO (50:50) should have been $1.44 \times 10^{-6}$/° C. in case of weighted average contribution, but actual obtained CTE value for the mixed feedstock is $1.33 \times 10^{-6}$/° C., thereby clearly indicating a synergy.

What is claimed is:

1. A process for production of graphite grade coke, the process comprising:
    (a) mixing coal tar pitch and clarified oil (CLO) streams to obtain a mixed feedstock and routing the mixed feedstock to a solvent treatment vessel where the mixed feedstock mixes with a solvent, wherein the coal tar pitch and the CLO are blended in a weight ratio ranging from 90:10 to 40:60;
    (b) separating the mixed feedstock into a heavy residual fraction containing impurities and a first purified mixed feedstock without impurities, and removing the heavy residual fraction as pitch from a bottom of the solvent treatment vessel, wherein the impurities are quinoline insoluble substances along with solid catalyst fines;
    (c) passing the pitch to a first heater to obtain a heated pitch and flashing the heated pitch into a first solvent recovery column;
    (d) withdrawing a heavy pitch stream from a bottom of the first solvent recovery column and routing an overhead of the first solvent recovery column containing recovered solvent stream back to the solvent treatment vessel;
(e) routing the first purified mixed feedstock from the solvent treatment vessel to a second heater to obtain a heated first purified mixed feedstock and flashing the heated first purified mixed feedstock into a second solvent recovery column;
(f) routing an overhead from the second solvent recovery column containing recovered solvent stream back to the solvent treatment vessel and routing a bottom from the second solvent recovery column to a bottom section of a fractionator column, wherein the bottom from the second solvent recovery column contains a second purified mixed feedstock without the solvent;
(g) mixing the second purified mixed feedstock obtained in step (f) with an internal recycle stream in the bottom section of the fractionator column to obtain a secondary feedstock and drawing out the secondary feedstock from the bottom section of the fractionator column, wherein the internal recycle stream is obtained after separation of gaseous products and liquid products from lighter hydrocarbon products that are routed to the fractionator column from a coke drum;
(h) heating the secondary feedstock in a coker heater to a thermal cracking temperature to obtain a hot secondary feedstock;
(i) routing the hot secondary feedstock to a coke drum for cracking the hot secondary feedstock to lighter hydrocarbon products and a graphite grade coke; wherein the graphite grade coke is a graphitizable needle coke and is deposited in the coke drum;
(j) routing the lighter hydrocarbon products from the coke drum to the fractionator column for separation into gaseous products and liquid products; and
(k) routing overhead vapour from the fractionator column comprising the gaseous products to a gas concentration section and withdrawing the liquid products from the fractionator column.

2. The process as claimed in claim 1, wherein the coal tar pitch and the clarified oil stream are mixed in a mixing tank to obtain the mixed feedstock.

3. The process as claimed in claim 2, wherein a solvent stream from a solvent tank is introduced into the mixing tank for solvent treatment of the mixed feedstock.

4. The process as claimed in claim 1, wherein a hydrotreated vacuum gas oil (VGO) is also mixed with the coal tar pitch and the CLO stream in a mixing tank to obtain the mixed feedstock; wherein addition of the hydrotreated VGO is in a range of 5 to 30 wt %.

5. The process as claimed in claim 1, wherein the recovered solvent streams from the first solvent recovery column and the second recovery column are routed to a solvent tank.

6. The process as claimed in claim 1, wherein the solvent for treatment of the mixed feedstock in the solvent treatment vessel is selected from a polar extraction solvent, an aliphatic solvent, an aromatic solvent, or a combination thereof;
wherein the polar extraction solvent is n-methyl-2-pyrrolidone (NMP);
wherein the aliphatic solvent is selected from cyclohexane, kerosene, diesel oil, and n-heptane;
wherein the aromatic solvent is selected from toluene, wash oil, anthracene oil, naphthalene oil, and benzene.

7. The process as claimed in claim 1, wherein the solvent in the solvent treatment vessel is mixed with the mixed feedstock in a weight ratio of solvent and mixed feedstock ranging from 2:1 to 50:1, and the solvent treatment vessel is operated at a temperature ranging from 55 to 300° C. and a pressure ranging from 1 to 60 Kg/cm$^2$ (g).

8. The process as claimed in claim 1, wherein the fractionator column is operated at a temperature ranging from 250° C. to 390° C.

9. The process as claimed in claim 1, wherein the thermal cracking temperature in the coker heater in step (h) ranges from 480° C. to 530° C.

10. The process as claimed in claim 1, wherein in the process step (h), steam is introduced to the coker heater to prevent coking in heater tubes and create a additional turbulent flow.

11. The process as claimed in claim 1, wherein the coke drum is operated at a temperature ranging from 475° C. to 520° C. and a top pressure is maintained between 1 to 6.5 Kg/cm$^2$ (g); wherein a feeding cycle time in the coke drum ranges from 16 hours to 48 hours.

12. A process for production of graphite grade coke, the process comprising:
(a) mixing coal tar pitch and clarified oil streams in a mixing tank to obtain a mixed feedstock, wherein the coal tar pitch and the clarified oil are blended in a weight ratio ranging from 90:10 to 40:60;
(b) routing a solvent stream from a solvent tank to the mixing tank for solvent treatment of the mixed feedstock,
(c) routing an outlet stream from the mixing tank to a separator vessel for separating the mixed feedstock into a heavy residual fraction containing impurities and a first purified mixed feedstock without impurities, and removing the heavy residual fraction as pitch from a bottom of the separator vessel, wherein the impurities are quinoline insoluble substances along with solid catalyst fines;
(d) passing the pitch to a first heater to obtain a heated pitch and flashing the heated pitch into a first solvent recovery column;
(e) withdrawing a heavy pitch stream from a bottom of the first solvent recovery column and routing an overhead of the first solvent recovery column containing recovered solvent stream back to the solvent tank;
(f) routing the first purified mixed feedstock from a top side of the separator vessel to a second heater to obtain a heated first purified mixed feedstock and flashing the heated first purified mixed feedstock into a second solvent recovery column;
(g) routing an overhead from the second solvent recovery column containing recovered solvent stream back to the solvent tank and routing a bottom from the second solvent recovery column to a bottom section of a fractionator column, wherein the bottom from the second solvent recovery column contains a second purified mixed feedstock without solvent;
(h) mixing the second purified mixed feedstock obtained in step (f) with an internal recycle stream in the bottom section of the fractionator column to obtain a secondary feedstock and drawing out the secondary feedstock from bottom of the fractionator column, wherein the internal recycle stream is obtained after separation of gaseous products and liquid products from lighter hydrocarbon products that are routed to the fractionator column from a coke drum;
(i) heating the secondary feedstock in a coker heater to a thermal cracking temperature to obtain a hot secondary feedstock;

(j) routing the hot secondary feedstock to a coke drum for cracking the hot secondary feedstock to lighter hydrocarbon products and a graphite grade coke; wherein the graphite grade coke is graphitizable needle coke and is deposited in the coke drum;
(k) routing the lighter hydrocarbon products from the coke drum to the fractionator column for separation into gaseous products and liquid products; and
(l) routing overhead vapour from the fractionator column comprising the gaseous products to a gas concentration section and withdrawing the liquid products from the fractionator column.

\* \* \* \* \*